United States Patent [19]

Sawata

[11] Patent Number: 5,161,141
[45] Date of Patent: Nov. 3, 1992

[54] OPTICAL DISK SYSTEM HAVING A STABLY DRIVEN SERVOMECHANISM FOR A LASER SYSTEM FOR READING SIGNAL TRACKS

[75] Inventor: Hisashi Sawata, Tokyo, Japan

[73] Assignee: NEC Corporation, Tokyo, Japan

[21] Appl. No.: 617,415

[22] Filed: Nov. 19, 1990

Related U.S. Application Data

[63] Continuation of Ser. No. 161,900, Feb. 29, 1988, abandoned.

[30] Foreign Application Priority Data

Feb. 27, 1987 [JP] Japan .................. 62-45711

[51] Int. Cl.[5] .................................. G11B 7/095
[52] U.S. Cl. .................. 369/44.25; 369/44.32; 369/44.35; 369/58
[58] Field of Search ........................ 369/32–33, 369/54, 58, 44.25, 44.28, 44.29, 44.32, 44.34–44.36; 250/201.1

[56] References Cited

U.S. PATENT DOCUMENTS 4,406,000 9/1983 Shoji et al. ..................... 369/44
4,414,655 11/1983 Shoji et al. ..................... 369/44
4,482,987 11/1984 Okada et al. .................... 369/44
4,506,149 3/1985 Utsumi ........................ 369/44 X
4,561,080 12/1985 Yamazaki ...................... 369/46 X
4,613,961 9/1986 Aarts ......................... 369/45 X
4,613,963 9/1986 Hirano ........................ 369/44
4,689,779 8/1987 Hayashi et al. ................. 369/44

*Primary Examiner*—Wayne R. Young
*Attorney, Agent, or Firm*—Laff, Whitesel, Conte & Saret

[57] ABSTRACT

An optical disk system comprises a laser system for optically reading a signal track on an optical disk by means of a laser beam so as to generate an electrical read-out signal, and a servo system receiving the read-out signal from the laser system for controlling the laser system so as to cause the laser system to trace the signal track on the optical disk. A drive power changing circuit is coupled to the servo system to selectively put the servo system either into a first condition in which a driving power of the servo system for controlling the laser system is limited not greater than a predetermined level or into a second condition in which the driving power of the servo system for controlling the laser system is not limited.

5 Claims, 5 Drawing Sheets

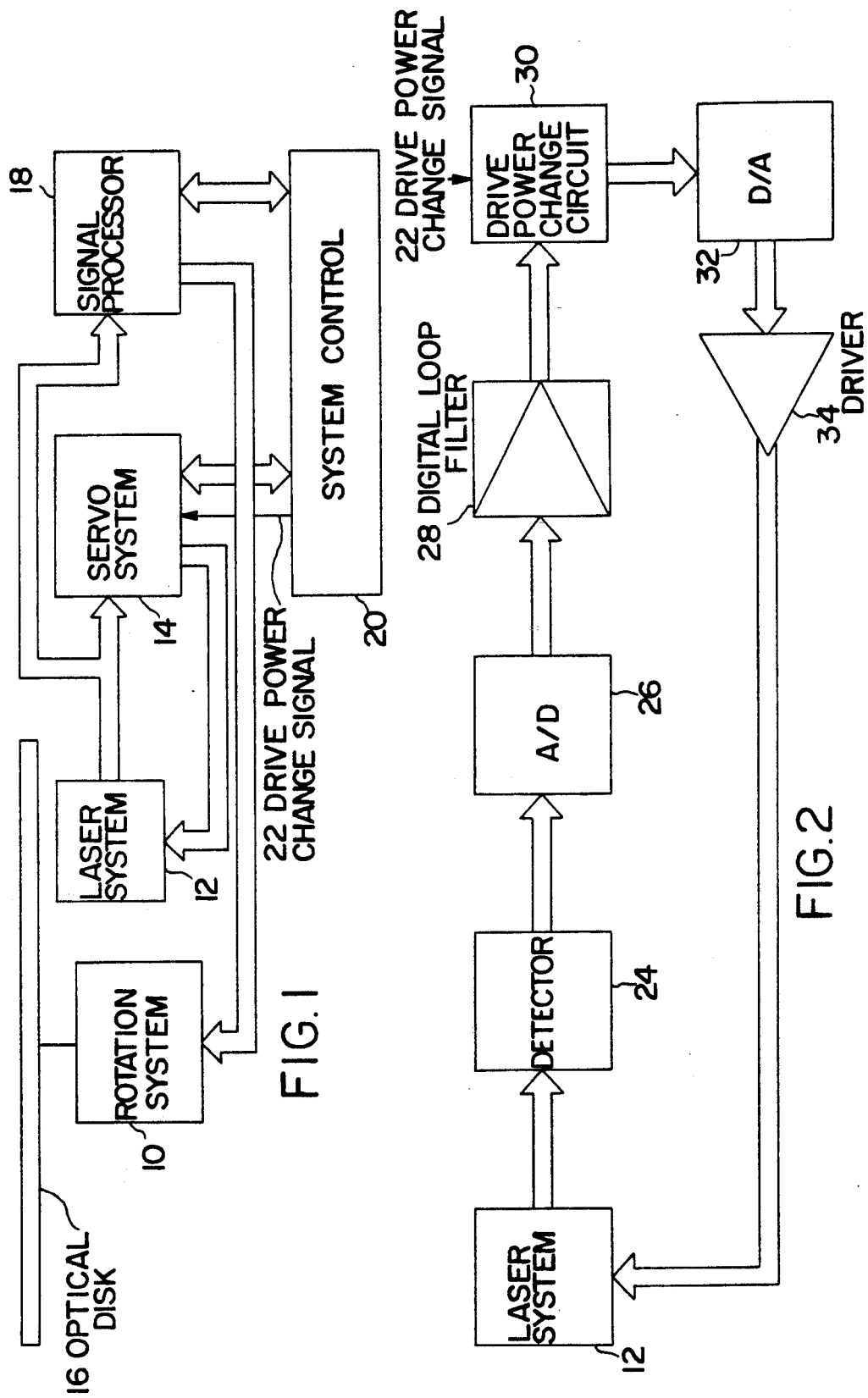

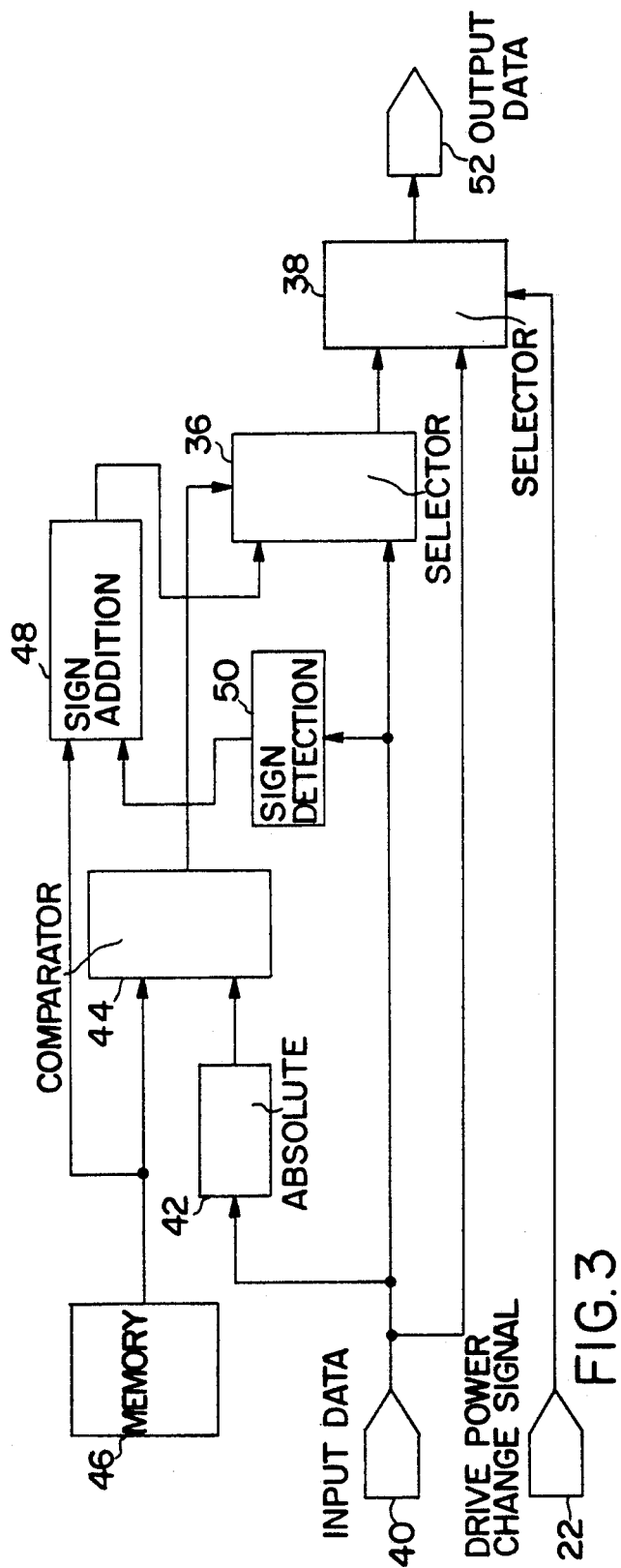
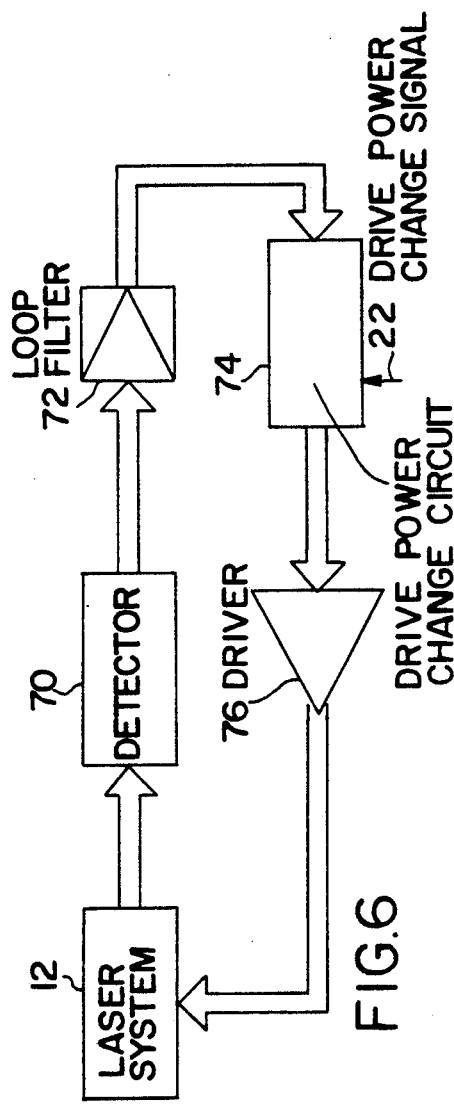
FIG.3
FIG.6

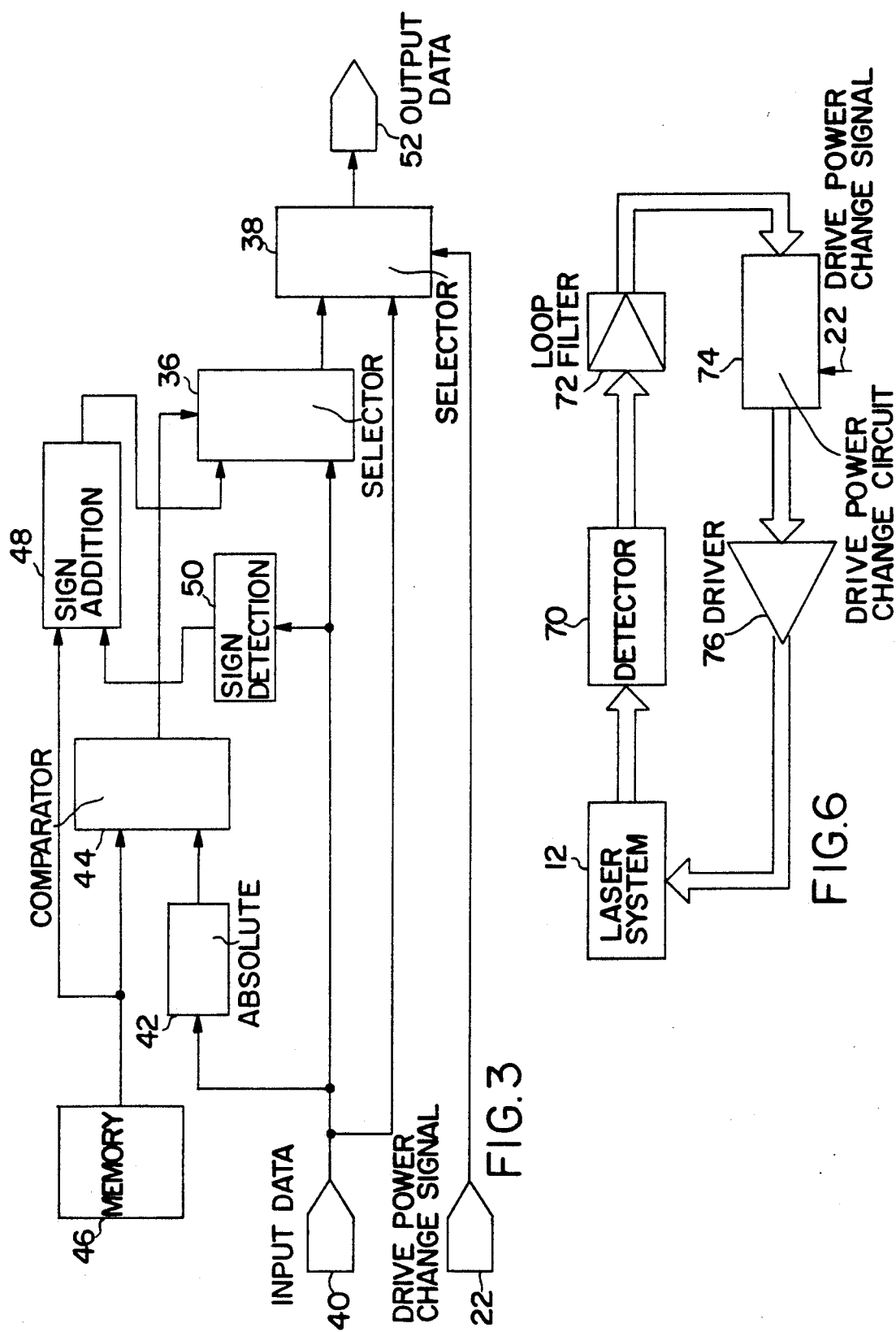

OPTICAL DISK SYSTEM HAVING A STABLY DRIVEN SERVOMECHANISM FOR A LASER SYSTEM FOR READING SIGNAL TRACKS

This application is a continuation of application Ser. No. 07/161,900 filed Feb. 29, 1988, now abandoned.

BACKGROUND OF THE INVENTION

1. Field of the Invention

The present invention relates to an optical disk system, and more particularly, to a servomechanism used in the optical disk system for causing a laser beam to trace a signal track on a optical disk.

2. Description of Related Art

Conventional optical disk players have been such that a signal track on an optical disk is scanned by a laser spot. The spot is held in focus and on a recorded track by various servomechanisms using optical sensing and electromechanical actuation. Further, such optical disk players are adapted to detect dust particles and scratches on the optical disk on the basis of a signal read out from the disk by the laser beam. The servo system is switched off, when the particles and scratches are found, in order to prevent a malfunction of the servo system which would otherwise be caused by the particles and scratches on the disk.

The above mentioned conventional optical disk players have complicated circuits since they have to include a circuit for detecting the particles and scratches on the optical disk. In addition, the conventional players have not been completely free from detection errors such as an oversight of the dust particle and scratches and a misdetection of the particles and scratches. Further, as mentioned above, when the particles and scratches are found, the servo system is switched off. Thereafter, if either the particle or the scratch are not found, the servo system is switched back on. Then, the servo system operation has been greatly disturbed as it responds to the momentary switching off of the servo system. As a result, the signal track of the disk cannot be often traced.

SUMMARY OF THE INVENTION

Accordingly, it is an object of the present invention to provide an optical disk system which has overcome the above mentioned defects.

Another object of the present invention is to provide an optical disk system capable of tracing a signal track on the optical disk without being influenced by the particles and scratches thereon.

A further object of the present invention is to provide such an optical disk system which is capable of tracing a signal track on the optical disk without the necessity of a circuit for detecting the particles and scratches thereon.

A still further object of the present invention is to provide such an optical disk system which is capable of tracing a signal track on the optical disk without malfunction caused by particles and scratches on the optical disk, while maintaining the servo operation in an active condition.

The above and other objects of the present invention are achieved in accordance with the present invention by an optical disk system comprising a laser system for optically reading a signal track on an optical disk. A laser beam generates an electrical read-out signal for driving a servo system. The read-out signal from the laser system controls the laser to cause it to trace the signal track on the optical disk. The servo system is selectively put into either a first condition in which a driving power of the servo system controlling the laser spot position is limited not greater than a predetermined level or a second condition in which the driving power of the servo system is not so limited.

When the servo system is in a servo operation condition which is capable of controlling the laser system, the servo system is put in the first condition. Under the first condition, since the driving power of the servo system is limited to be below the predetermined level, the servo system cannot move the laser system to an extreme position. Therefore, even if the particles or scratches exist on the optical disk, the laser system will trace the signal track on the optical disk without going out the signal track.

In the conventional system, when the servo system operates in a stable condition, if the particles or scratches on the optical disk are found, the servo system has often malfunctioned because of the particles and scratches, with the result that the servo system erroneously drives the laser system to an extreme position. This is one reason for the mis-tracing of the conventional optical system when the particles and scratches on the optical disk are found. In the inventive optical disk system, the driving power of the servo system is limited so that it may not become greater than the predetermined level. The servo system cannot move the laser system out of the signal track to be traced even if the particles or scratches exist on the optical disk. Namely, the laser system will continue to trace the signal track on the optical disk without going out of the signal track.

On the other hand, the driving power of the servo system is not limited when it should be switched on to become capable of controlling the laser system, i.e. when the servo system should be in a linear response mode. Therefore, the servo system can quickly move the laser system by a required amount so that the laser system can be rapidly driven to a position where it is capable of properly tracing the signal track.

Further, as can be understood from the above mentioned arrangement, the optical disk system in accordance with the present invention will not need a circuit for detecting the particles and scratches on the optical disk. Therefore, the circuit construction is simple as compared with the more complicated circuits of the conventional laser disk reading system. Also, the inventive system is free from the detection error caused by the particles and scratches on the optical disk.

In addition, the inventive optical disk system is free from the unstable operation which may be caused when the servo system is switched on after the servo operation had been switched off in response to the detection of the particles or scratches on the optical disk.

The above and other objects, features and advantages of the present invention will be apparent from the following description of preferred embodiments of the invention with reference to the accompanying drawings.

BRIEF DESCRIPTION OF THE DRAWINGS

FIG. 1 is a block diagram of one embodiment of the optical disk system in accordance with the present invention;

FIG. 2 is a block diagram of the servo system incorporated in the optical disk system shown in FIG. 1;

FIG. 3 is a block diagram of the drive power changing circuit incorporated in the servo system shown in FIG. 2;

FIG. 5 is a waveform diagram illustrating an operation of the optical disk system incorporating the drive power changing circuit shown in FIG. 4;

FIG. 6 is a block diagram of another embodiment of the servo system incorporated in the optical disk system shown in FIG. 1.

DESCRIPTION OF THE PREFERRED EMBODIMENT

Figure 4:
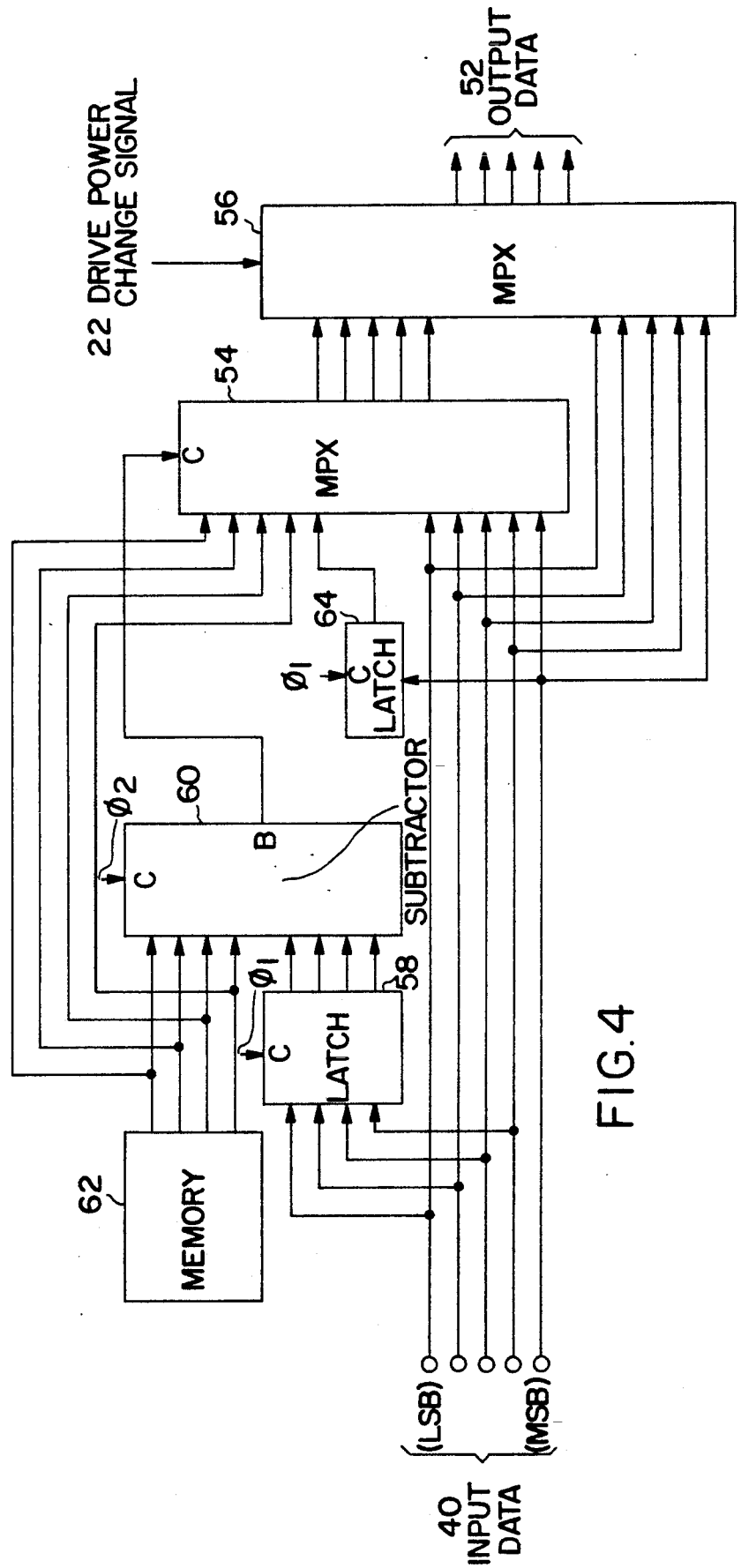
FIG. 4 is a more detailed block diagram of the drive power changing circuit shown in FIG. 3.

FIG. 1 shows an embodiment of the inventive optical disk system which comprises a disk rotating system 10, a laser system 12 and a servo system 14, all of which cooperate to trace a signal track formed on an optical disk 16. As shown, the rotating system 10 turns the optical disk 16 under the control of a signal processing circuit 18. On the other hand, the laser system 12 reads a train of signals formed on the optical disk as a track composed of convexes and concaves (pits). This reading of the signal track is made by use of a laser beam operating in a non-contact manner. The read-out signal is fed to the servo system 14 as control data and to the signal processing circuit 18 as a replay data. In response to the read-out signal, the servo system 14 controls the laser system 12 so that the laser beam remains in focus and remains on the signal track of the optical disk.

The signal processing circuit 18 treats the signal read from the optical disk by the laser system 12 and outputs the treated signal to a system control circuit 20. The system control circuit 20 controls the servo system 14 and the signal processing circuit 18.

The above mentioned construction is well known to persons skilled in the art. Therefore, a detailed explanation of the construction and operation will be omitted as to those portions which do not directly relate to the gist of the present invention.

The embodiment shown in FIG. 1 is different from the conventional optical disk system. The system control circuit 20 generates a drive power changing signal 22 in accordance with the condition of the servo system or, if desired, on command. The drive power changing signal 22 is applied to the servo system 14 to limit the drive power which may be applied to the servo system for moving the lens of the laser system 12, the driving power being limited to below a predetermined level or value.

FIG. 2 is a block diagram of one embodiment of the servo system 14. The shown servo system has a digital type of loop filter which compensates for the degree of amplification and the phase in a specified frequency region.

The output of the laser system 12 is supplied to a detector 24, which generates an error signal indicative of a deviation of the focus position from a proper position on the signal track on the optical disk. The error signal is fed to an analog to digital convertor 26, from which a converted signal is inputted to a digital loop filter 28. An output of the filter 28 is supplied to a drive power change circuit 30. This drive power change circuit 30 further receives the drive power change signal 22 from the system control circuit 20, and operates under control of the drive power change signal to selectively send the output of the digital loop filter either as it is or in a limited fashion. The thus adjusted output from the drive power change circuit 30 is inputted to a digital to analog convertor 32, whose output is applied to a drive circuit 34 for driving the laser system 12. Accordingly, a servo loop is constituted.

FIG. 3 is a detailed block diagram of the drive power change circuit 30 which is shown as a block in FIG. 2. The FIG. 3 circuit has a pair of input selectors 36 and 38 which receive at one of their inputs to data 40 which was outputted from the loop filter 28. An output of the selector 36 is coupled to the other input of the input selector 38. When the drive power change signal 22 is active, the selector 38 sends the output of the selector 36 as an output data 52 to the digital to analog convertor 32 (FIG. 2). On the other hand, when the drive power change signal 22 is not active, the selector 38 outputs without change the input data 40 to the digital to analog convertor 32.

Further, the input data 40 is also fed to an absolute value conversion circuit 42, which generates an absolute value signal to one input of a comparator 44. This comparator 44 receives at its other input a predetermined value which is stored in a memory 46 and outputs the result of the comparison to a control input of the input selector 36. The predetermined value stored in the memory 46 is also supplied to a sign addition circuit 50. The input data 40 is also fed to a sign detection circuit 50 which generates a sign signal indicative of a sign of the input data 40. This sign signal is applied from circuit 50 to the sign addition circuit 48, which outputs the signal-added predetermined value to the other input of the input selector 36. Thus, when the comparator 44 judges that the input data 40 is not greater than the predetermined value stored in the memory 46, the input selector 36 outputs the input data 40 to the input selector 38. However, when the comparator 44 judges that the input data 40 is greater than the predetermined value stored in the memory 46, the input selector 36 outputs the predetermined sign-added value from the sign addition circuit 48 to the input selector 38.

As mentioned above, when the drive power change signal is not active, the input data 40 is supplied to the digital to analog convertor 32, without being limited. Namely, the drive power is not limited at all. However, when the drive power change signal is active, the data supplied to the digital to analog convertor 32 is limited to a level which is below the predetermined value set in the memory 46, since the predetermined value is supplied in place of the input data 40 when the input data 40 is greater than the predetermined value.

If the drive power supplied to the drive circuit 34 (FIG. 2) is limited to a level which is not greater than the predetermined value, an accelerating speed of the lens of the laser system 12 is also limited to be below a corresponding predetermined value. Therefore, even if the particles and/or scratches are found on the optical disk when the focal point of the laser beam traces the signal track on the optical disk, and even if the detector 24 generates a large error signal, the lens of the laser system 12 will not be driven to an extreme. Accordingly, the focal point of the laser system will not deviate very much from the signal track on the optical disk which is to be traced.

On the other hand, if the drive power of the drive circuit 15 is not limited, when the focal point of the laser beam of the laser system 12 is greatly deviated from the signal track on the optical disk, the drive circuit 34 can output a large error signal. That is a high level of drive power to the laser system 12 so that the lens of the laser system is rapidly moved so as to locate the focal point of the laser beam onto the signal track with a short time.

Therefore, when the system is in such a condition, the servo operation is in an active condition and the laser beam of the laser system stably trace the signal track on the optical disk. The system control circuit is set to generate an active drive power change signal 22 requiring that the drive power outputted from the servo system to be not greater than the predetermined value set in the memory 46.

On the other hand, there are times when the servo system should be maintained in a linear response condition. For example, during a predetermined period of time beginning with a start of the laser beam tracing of the signal track on the optical disk, or for another predetermined period of time beginning with a change of the signal track to be traced, the system control circuit is set to generate an inactive drive power change signal 22 so that the drive power outputted from the servo system is not limited at all. This unlimited drive power signal allows the laser beam of the laser system to precisely and rapidly trace the signal track.

FIG. 4 is a more detailed block diagram of the drive power change circuit which handles data in the length of 5 bits. In this case, the data 40 outputted from the digital loop filter 28 (FIG. 2) has the length of 5 bits, a most significant bit of which indicates the sign of the data or the direction of an error. The other four of the five bits indicate the magnitude of the error.

The five bit data 40 from the loop filter 28 is inputted to a first five-bit input of each of a pair of multiplexors 54 and 56 (FIG. 4) which act as the input selectors 36 and 38. A five-bit output of the multiplexor 54 is applied to the other five-bit input of the multiplexor 56, which is controlled by the drive power change signal 22 to output a selected one of the two five bit inputs as a five-bit output 52 to the digital to analog convertor 32 (FIG. 2). Further, four bits of the input data 40, excluding the most significant bit, are inputted to a latch circuit 58 functioning as the absolute circuit 42 (FIG. 3). The content of the latch 58 is applied to one input of a digital subtractor 60 which functions as the comparator 44 (FIG. 3). The other input of the subtractor 60 receives a four bit data, which is indicative of the predetermined value, from a memory 62 corresponding to the memory 46. The output of the memory 62 is also unapplied to four bits of the other five-bit input of the multiplexor 54, excluding the most significant bit. The most significant bit of the other input of the multiplexor 54 is applied to another latch 64. Further, the subtractor 60 has a borrow signal terminal which is connected to a control terminal of the multiplexor 54 so that, in response to the borrow signal, the multiplexor 54 outputs a selected one of the two five-bit inputs to the multiplexor 56.

Now, operation will be explained with reference to FIG. 5 which illustrates one example of the operation. The output of the detection circuit 24 (FIG. 2) is a tracking error signal or a so-called focus error signal. This signal is cyclically sampled at a predetermined cycle rate and then is converted into a digital signal. It is here assumed that the output of the detection circuit 24 is very roughly sampled for simplification of the drawing. Further, the analog to digital convertor 26 generates the five-bit data signal as mentioned above, the most significant bit of which is indicative of the sign. Namely, "0" shows that the error is either zero or in a positive direction. The error is taken with respect to a desired center value. A "1" shows that the error is in a negative direction. The other or lower four bits are indicative of the absolute value of the error. In addition, the memory 62 (FIG. 4) is set with "0111", as the predetermined value.

In synchronism with a clock signal $\phi 1$, the lower four bits of the output 40 (FIG. 4) from the loop filter 28 (FIG. 2) are latched in the latch 58 (FIG. 4) and the most significant bit is latched in the latch 64. In synchronism with another clock signal $\phi 2$, the subtractor 60 executes a subtraction between the value held in the latch 58 and the predetermined value of "0111" from the memory 62 and generates a borrow signal when the predetermined value "0111" is smaller than the latched value. In response to the borrow signal, the multiplexor 54 selects the outputs of the memory 62 and of the latch 64 and outputs the combined or sign-added predetermined value to the multiplexor 56. Otherwise, the multiplexor 54 selects the input data 40 and outputs it to the multiplexor 56. On the other hand, the multiplexor 56 outputs the output of the multiplexor 54 when the drive power change signal 22 is active and the input data 40 when the drive power change signal 22 is not active.

FIG. 6 is a block diagram of another embodiment of the servo system 14. The shown servo system has an analog type of loop filter which compensates for the degree of amplification and the phase in a specified frequency region.

The output of the laser system 12 is supplied to a detector 70, which generates an analog error signal that is indicative of a deviation of the focus position from a proper position on the signal track on the optical disk. The error signal is fed to an analog loop filter 72. An analog output of the filter 72 is supplied to a drive power change circuit 74. This drive power change circuit 74 further receives the drive power change signal 22 (FIG. 2) from the system control circuit 20 (FIG. 1) power change circuit 74 operates under the control of the drive power change signal 22 to selectively output the analog output of the loop filter 72 either as it is or in a limited fashion. The output from the drive power change circuit 74 is inputted to a drive circuit 76 for driving the laser system 12. Accordingly, a servo loop is constituted.

Figure 7:
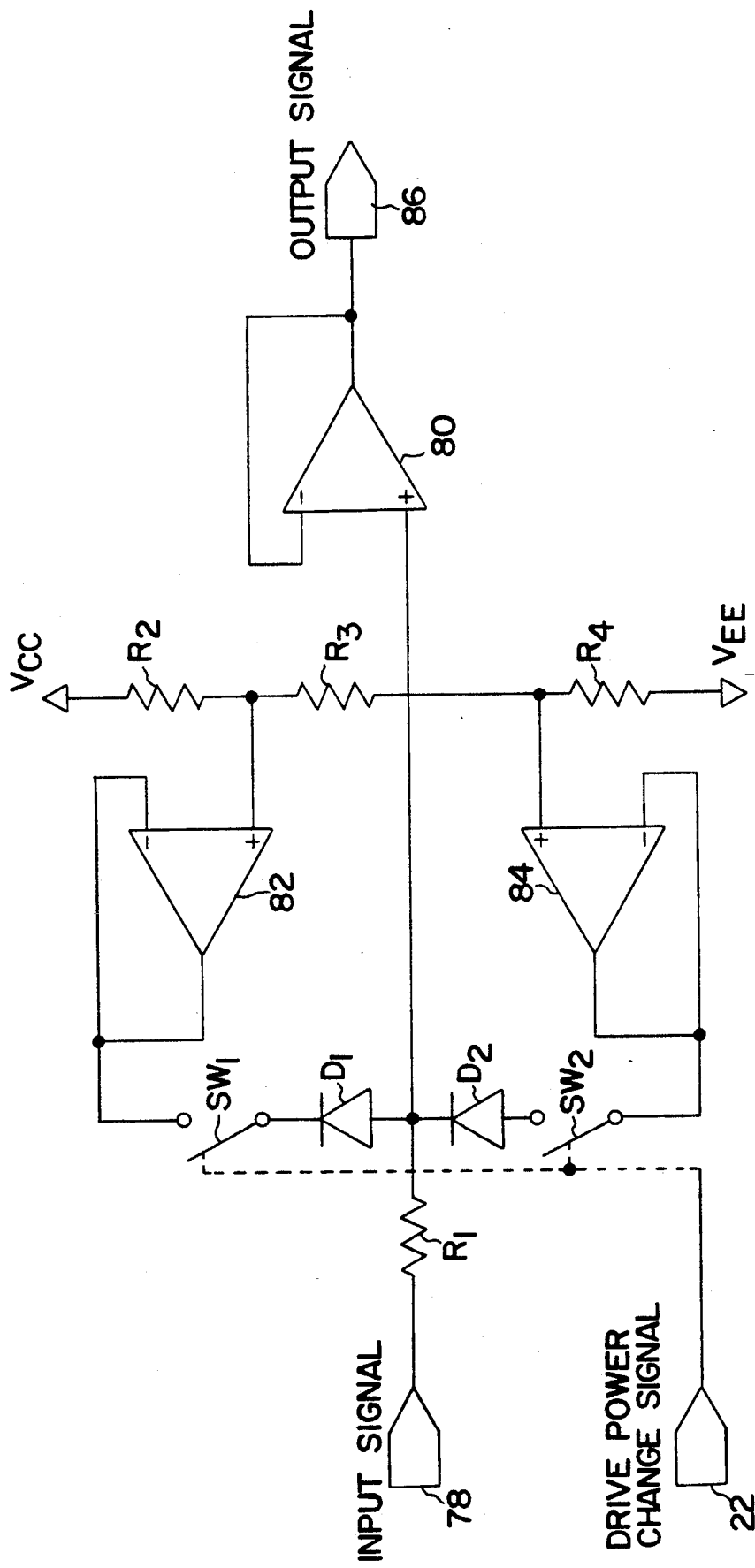
FIG. 7 is a detailed block diagram of the drive power changing circuit incorporated in the servo system shown in FIG. 6.

FIG. 7 is a detailed block diagram of the drive power change circuit 74 shown in FIG. 6. In the circuit of FIG. 7, the analog signal outputted from the loop filter 72 (FIG. 6) is fed through a resistor $R_1$ (FIG. 7) to a non-inverting input of an operational amplifier 80. To the non-inverting input of the amplifier 80, a first diode $D_1$ is connected at its anode and a second diode $D_2$ is connected at its cathode. A cathode of the diode $D_2$ is connected through a switch $SW_1$ to an output of an operational amplifier 82. An anode of the diode $D_2$ is connected through a switch $SW_2$ to an output of an operational amplifier 84. The switches $SW_2$ and $SW_2$ are on-off controlled by the drive power change signal 22 (FIG. 2) from the system control circuit 20 (FIG. 1). Each of the operational amplifiers 82 and 84 has an inverting input connected to the output of the amplifier itself. Further, a voltage divider composed of three series resistors $R_2$, $R_3$ and $R_4$ is connected between a positive voltage terminal VCC and a negative voltage terminal VEE. A anode between the resistors $R_2$ and $R_3$ is connected to a non-inverting input of the operational amplifier 82. A anode between the resistors $R_3$ and $R_4$ is connected to a non-inverting input of the operational amplifier 84.

When the drive power change signal 22 (FIG. 2) is not active, the switches $SW_1$ and $SW_2$ are switched into an off condition so that the analog signal 78 which outputted from the loop filter 72 (FIG. 6) is inputted directly to the operational amplifier 80 and then outputted as an output analog signal 86 from the amplifier 80 to the drive circuit 76. On the other hand, when the drive power change signal 22 is active, the switched $SW_1$ and $SW_2$ are switched into an on condition. In this condition, if the analog signal 78 outputted from the loop filter. 72 is greater than the output voltage of the operational amplifier 82, the diode $D_1$ will clamp the voltage of the non-inverting input of the operational amplifier 80 to the output voltage of the operational amplifier 82. On the other hand, if the signal 78 is smaller than the output voltage of the operational amplifier 84, the diode $D_2$ will clamp the voltage of the non-inverting input of the operational amplifier 80 to the output voltage of the operational amplifier 84. Thus, the output analog signal 86 is limited to be within a voltage region determined by the output voltages of the two operational amplifiers 82 and 84, hence, by the voltage divider composed of the resistors $R_2$, $R_3$ and $R_4$.

Thus, there is a similarity to the first embodiment shown in FIGS. 2 and 3. When the drive power change signal is not active, the input signal 78 is supplied to the drive circuit 76 without being limited. Namely, the drive power is not limited at all. However, when the drive power change signal is active, the analog signal supplied to the drive circuit 76 is limited to be within the predetermined range set in the voltage divider.

The invention has thus been shown and described with reference to the specific embodiments. However, it should be noted that the present invention is in no way-limited to the details of the illustrated structures but changes and modifications may be made within the scope of the appended claims.

I claim:

1. An optical disk system comprising a laser system for optically reading a signal track on an optical disk by means of a laser beam so as to generate an electrical read-out signal; a servo system responsive to the read-out signal from the laser system for outputting a driving power which controls the laser system so as to cause the laser system to trace the signal track on the optical disk; and means for supplying to the servo system a drive power change signal, which selectively takes either a first condition instructing the servo system to output a driving power which does not exceed a predetermined level or a second condition instructing the servo system to output a driving power which is allowed to exceed said predetermined level;

said servo system comprising:
means receiving the read-out signal from the laser system for detecting an error signal indicative of a tracking error included in the read-signal, and for generating a detection signal indicative of whether or not the error signal is larger than a reference level; means responsive to the first condition of the drive power change signal, the error signal, and the detection signal for supplying said laser system with a drive power within a range which does not exceed said predetermined level; and means responsive to the second condition of the drive power change signal and the error signal for supplying said laser system with a drive power which is allowed to exceed said predetermined level, regardless of the detection signal.

2. An optical disk system comprising;
a laser system for generating an electrical read-out signal in response to optically reading a signal track on an optical disk by means of a laser beam;
a servo system responsive to the electrical read-out signal from the laser system, said servo system controlling the laser system so as to cause the laser system to trace the signal track on the optical disk; and
means coupled to the servo system for selectively putting the servo system either into a first condition in which a driving power of the servo system is limited to a level which is not greater than a predetermined level or into a second condition in which the level of the driving power of the servo system is not limited,
said servo system including a detector coupled to receive the electrical read-out signal from the laser system for generating an error signal, an analog-to-digital convertor connected to receive the error signal from the detector for generating a digitized error signal, a digital loop filter coupled to receive the digitized error signal outputted from the analog-to-digital convertor, a drive power changing circuit coupled to receive an output of the digital loop filter and a drive power change signal outputted from said means for selectively putting the servo system either into the first condition or into the second condition, the drive power changing circuit being controlled by the drive power change signal for selectively outputting said output of the digital loop filter either as it is or in a limited condition not exceeding the predetermined level, a digital-to-analog convertor coupled to receive an output of the drive power changing circuit, and a drive circuit responsive to an output of a digital-to-analog convertor for driving the laser system on the basis of a digitized output of the drive power changing circuit.

3. A system as claimed in claim 2 wherein the drive power change circuit includes:
first and second selectors each receiving at one of its inputs the data outputted from the loop filter, an output of the first selector being coupled to another input of the second selector, the second selector being controlled by the drive power change signal so that when the drive power change signal is active, the second selector outputs the output of the first selector to the digital-to-analog convertor and when the drive power change signal is not active, the second selector outputs the input data from the loop filter to the digital-to-analog convertor;
an absolute value conversion circuit receiving data from the loop filter to generate an absolute value signal;
a comparator receiving at one input the absolute value signal and at another input a predetermined value stored in a memory for outputting the result of a comparison to a control input of the first selector;
a sign addition circuit receiving the output of the memory and a sign signal indicative of a sign of the loop filter input data for generating a sign-added predetermined value to the other input of the first selector;

whereby when the comparator judges that the loop filter input data is not greater than the predetermined value stored in the memory, the first selector outputs the loop filter input data to the second selector and, when the comparator judges that the input data is greater than the predetermined value stored in the memory, the first selector outputs the sign-added predetermined value to the second selector.

4. An optical disk system comprising a laser system for optically reading a signal track on an optical disk so as to generate an error signal; and a servo system receiving the error signal from tho laser system for controlling the laser system so as to cause the laser system to trace the signal track on the optical disk, the servo system including an absolute value conversion circuit receiving the error signal from the laser system to generate an absolute value signal, a memory storing a predetermined value for limiting the servo drive power, comparator receiving at one input the absolute value signal and at another input the predetermined value stored in the memory for outputting the result of comparison, a sign detection circuit coupled to receive the error signal from the laser system for generating a sign signal indicative of a sign of the error signal, a sign addition circuit receiving the output of memory and the sign signal for generating a sign-added predetermined value, and a first selector receiving at one input the error outputted from the laser system and at another input the sign-added predetermined value and controlled by the result of comparison from the comparator so that when the comparator judges that the error signal is not greater than the predetermined value stored in the memory, the first selector outputs the error signal as it is and, when the comparator judges that the error signal is greater than the predetermined value stored in the memory, the first selector outputs the sign-added predetermined value.

5. A system as claimed in claim 4 wherein the servo system further includes a second selector receiving at one input the error outputted from the laser system and at another input the output of the first selector, the second selector being controlled by a drive power change signal so that when the drive power change signal is active, the second selector outputs the output of the first selector, and when the drive power change signal is not active, the second selector outputs the error signal from the laser system.

* * * * *